(12) United States Patent
Marelli et al.

(10) Patent No.: US 10,373,735 B2
(45) Date of Patent: Aug. 6, 2019

(54) SUBMARINE ELECTRICAL CABLE AND SUBMARINE CABLE OPERATION METHOD

(71) Applicant: PRYSMIAN S.p.A., Milan (IT)

(72) Inventors: Marco Marelli, Milan (IT); Luigi Colla, Milan (IT)

(73) Assignee: PRYSMIAN S.p.A., Milan (IT)

( * ) Notice: Subject to any disclaimer, the term of this patent is extended or adjusted under 35 U.S.C. 154(b) by 128 days.

(21) Appl. No.: 15/508,760

(22) PCT Filed: Sep. 5, 2014

(86) PCT No.: PCT/EP2014/068899
§ 371 (c)(1),
(2) Date: Mar. 3, 2017

(87) PCT Pub. No.: WO2016/034243
PCT Pub. Date: Mar. 10, 2016

(65) Prior Publication Data
US 2018/0226176 A1    Aug. 9, 2018

(51) Int. Cl.
| | |
|---|---|
| *H01B 7/14* | (2006.01) |
| *H02J 3/38* | (2006.01) |
| *H01B 7/00* | (2006.01) |
| *H01B 7/18* | (2006.01) |
| *H01B 9/00* | (2006.01) |
| *H01B 9/02* | (2006.01) |
| *H01B 7/26* | (2006.01) |

(52) U.S. Cl.
CPC .............. *H01B 7/14* (2013.01); *H01B 7/0009* (2013.01); *H01B 7/1875* (2013.01); *H01B 9/005* (2013.01); *H01B 9/027* (2013.01); *H02J 3/386* (2013.01); *H01B 7/26* (2013.01); *Y02E 10/763* (2013.01)

(58) Field of Classification Search
None
See application file for complete search history.

(56) References Cited

U.S. PATENT DOCUMENTS

| | | | | |
|---|---|---|---|---|
| 7,932,621 B1 * | 4/2011 | Spellman | ................ | H02J 3/383 307/2 |
| 2008/0236867 A1 * | 10/2008 | Varkey | ................... | H01B 7/046 174/115 |

(Continued)

FOREIGN PATENT DOCUMENTS

| | | |
|---|---|---|
| CN | 102855981 A | 1/2013 |
| EP | 2 065 901 A2 | 6/2009 |

(Continued)

OTHER PUBLICATIONS

International Search Report dated May 4, 2015, in PCT/EP2014/068899 filed Sep. 5, 2014.

*Primary Examiner* — Thienvu V Tran
*Assistant Examiner* — David M Stables
(74) *Attorney, Agent, or Firm* — Oblon, McClelland, Maier & Neustadt, L.L.P.

(57) ABSTRACT

Submarine electrical cable system (100) having a substantially circular cross-section and comprising: a first insulated core (1) and a second insulated core (2); a three-phase cable (3) comprising three stranded insulated cores (8) the three-phase cable (3) being stranded with the first core (1) and the second core (2); an armor (4) surrounding the first core (1), the second core (2) and the three-phase cable (3).

21 Claims, 3 Drawing Sheets

(56) References Cited

U.S. PATENT DOCUMENTS

| | | |
|---|---|---|
| 2009/0134625 A1 | 5/2009 | Altenschulte |
| 2012/0205137 A1 | 8/2012 | Fjellner et al. |
| 2013/0220660 A1* | 8/2013 | Wong .................... H01B 7/046 |
| | | 174/37 |
| 2014/0153159 A1 | 6/2014 | Hazel et al. |

FOREIGN PATENT DOCUMENTS

| | | |
|---|---|---|
| EP | 2 065 901 A3 | 6/2009 |
| WO | WO 2011/059337 A1 | 5/2011 |
| WO | WO 2012/042189 A1 | 4/2012 |

* cited by examiner

US 10,373,735 B2

SUBMARINE ELECTRICAL CABLE AND SUBMARINE CABLE OPERATION METHOD

BACKGROUND

Technical Field

The present invention relates to the field of the submarine cables. Particularly, the present invention relates to the transmission of alternate current (AC) electrical power and direct current (DC) electrical power by submarine cables.

Description of the Related Art

Submarine cables are employed in several scenarios, such as in offshore wind farms, power supply to islands, connection of autonomous grids, supply of marine platforms, short-haul crossings (e.g. transport of power across rivers, channels, straits, fjords, bays or lakes). Generally the power transported is at high voltage (HV), i.e. at a voltage greater than 30 kV.

Known AC submarine power transport systems usually comprise a cable including three electrically insulated conductors or cores individually shielded and enclosed within a common armour.

Known DC submarine power transport systems usually comprise two single-core submarine cables where each insulated conductor or core is suitably shielded and surrounded by an armour. In some instance the two insulated and shielded conductors are stranded and enclosed by common armour resulting in a flat DC cable. Flat two-core cables can be bent easily in one direction only. This property makes manufacturing, loading, and installing difficult and requires considerable investments in equipment. As a consequence, the provision of two separated single-core submarine DC cables, each individually armoured, is more common for DC submarine power transport systems.

Submarine cables are exposed to mechanical forces during installation and the armour provides the necessary withstanding capability and some mechanical protection against external origin damages.

In some practical applications, it may be necessary to transmit power, simultaneously or not, along the same route both in AC and DC.

"Advances in Wind Energy Conversion Technology", p. 187-188, ISBN 978-3-540-88257-2, Springer 2011 relates to grid integration of offshore wind farms. For wind turbines equipped with AC-DC-AC converters, a solution is to combine HVAC and HVDC systems. The scheme exemplified in FIG. 7 of such document comprises a 200 MW HVAC cable circuit and a separated 800 MW HVDC cable pair.

Granadino et al., "400 kV 700 MW Fluid Filled Submarine Cables for the Spain-Morocco Interconnection", CIGRÉ, Session 2000, 21-301 relates to a power network comprising a submarine link. The power transmission of the link is in a.c., however, cables and accessories were designed and tested to be capable to operate in the future in d.c. So the cables should be suitable for a.c. and d.c. transmission. A "fluid filled" design is proposed for such cables.

BRIEF SUMMARY OF THE INVENTION

The technical problem addressed by the invention is that of simplifying a submarine electric connection requiring transport of AC and DC power, thus reducing manufacturing and installation costs thereof.

The applicant has found that two DC power cores and an AC three-phase cable can be joined to form a single submarine cable system having a substantially circular cross-section, where all of the cores are surrounded by common armouring layers.

The so-conceived submarine cable system allows the deployment of the two cores for DC power transmission and of the three-phase cable for AC transmission in a single shot, with resulting cost reduction. A further cost reduction comes from the possibility of providing a single armouring in the place of three (one for the three-phase AC cable and two for the two single core-DC cable). Also transportation to the deployment site, laying, protection, are foreseen to be less expensive.

According to a first aspect, the present invention relates to a submarine electrical cable system having a substantially circular cross-section and comprising:

a first insulated core and a second insulated core;

a three-phase cable comprising three stranded insulated cores, the three-phase cable being stranded with the first core and the second core;

an armour surrounding the first core, the second core and the three-phase cable.

In the present description and claims as "insulated core" it is meant an electrical conductor having a circular cross-section and sequentially surrounded by an inner semiconducting layer, an insulating layer, an outer semiconducting layer and a metallic screen. In the case of the three-phase cable, a single metallic screen can be provided to surround all of the three insulated cores, as an alternative to a metallic screen for each of the three insulated cores.

The first and the second insulated core of the cable system of the invention are suitable for DC transmission. The three stranded insulated cores of the three-phase cable are suitable for AC transmission. As "suitable for" it is meant that a cable system portion is designed for an intended current transport so as, for example, the insulation layer shall be selected for minimizing the AC losses or for avoiding the space charge accumulation affecting the DC transmission as known to the skilled person and as needed for the specific application.

In accordance with an embodiment, said three-phase cable comprises a first sheath surrounding the three stranded insulated cores and, in the case, the metallic screen around them. Between the first sheath and the three stranded insulated cores a filler is provided.

The three insulated cores of the three-phase cable are stranded with a unidirectional lay according to a first pitch and a first lay direction, or with an S-Z lay. The first core, the second core and the three-phase cable are stranded with a unidirectional lay according to a second pitch and a second lay direction, or with an S-Z lay.

As "unidirectional lay" it is meant a stranding with a continuous helix along the cable length. As "S-Z lay" it is meant a stranding where the helix direction is periodically reversed along the cable length.

Advantageously, when the stranding of the three insulated cores and that of first core with the second core and the three-phase cable are made with a unidirectional layer, the second lay direction is opposite to the first lay direction.

Preferably, the three insulated cores of the three-phase cable are stranded with a unidirectional lay according to a first pitch and a first lay direction, and first core, the second core and the three-phase cable are stranded with an S-Z lay.

The armour of the cable system of the invention can comprise a plurality of armour wires arranged in a single armour layer or in two armour layers (inner and outer armour layer). The armour wires of each layer are wound around the three-phase cable stranded with the first core and the second core. The winding lay of the armour wire is preferably unidirectional. In particular, the armour wires of the single armour layer or of the inner armour layer can be wound with a unidirectional lay according to a third pitch and a third lay direction.

Advantageously, the third lay direction is the same of the first lay direction. This lay direction construction allows a reduction of the armour losses caused by the magnetic field induced by the AC transport, as disclosed in WO2013/174399 and WO2013/174455.

Advantageously, the third pitch is from 0.4 to 2.5 times the first pitch. Preferably, the third pitch is substantially equal to the first pitch, differing from the first pitch of 1% at most. This pitch configuration reduces the armour losses due to the AC transport. When the third lay direction is the same of the first lay direction and the third pitch is substantially equal to the first pitch, the armour losses can be reduced substantially to zero.

Preferably the insulation layer of the first core, of the second core and the three stranded cores are made of extrudable polymeric material. Extruded polymeric material suitable for the insulation layer of the cable system of the invention are thermoplastic, e.g. polyethylene, polypropylene, or thermoset, e.g. crosslinked polyethylene, ethylene propylene rubber.

In accordance with an operative embodiment, the first core and the second core are configured to carry a direct current at a voltage of 600 kV at most, preferably at a voltage of 80 kV at least. In particular, the first core and the second core are configured to carry a direct current at a voltage of 300-400 kV.

In accordance with an operative embodiment, the three-phase cable is configured to carry an alternate current at a voltage of 170 kV at most, preferably at a voltage of 30 kV at least.

According to an embodiment, the first core and the second core are configured to perform a DC power transfer at a first power value included in the range 500-1500 MW and the three-phase cable is configured to perform an AC power transfer at a second power value included in the range of from 5 to 200 MW, preferably of from 5 to 80 MW. As an example, the submarine cable system has a length lower than 400 km.

The first and second insulated core and the three-phase cable of the cable system of the invention have substantially the same diameter. In particular, the diameters of the first and second insulated core and three-phase cable preferably differ one another of 2% at most, more preferably of 1% at most to provide the cable system of a satisfactorily circular cross-section.

The construction of the cable system of the invention can start from the selection of the diameters of the first and second insulated core in view of the power requested for the DC transmission. As a second step, the power of the AC transmission possibly carried by the three-phase cable for a given length is calculated and the three-phase cable is designed accordingly. In the event the diameter of the three-phase cable is smaller than those of first and second insulated core of more than 2%, the dimensions of the three-phase cable can be increased by, e.g., selecting different conductors for the three stranded insulated cores, increasing the thickness of layers surrounding the conductor/s, such as metallic screens, sheath and/or the insulating layers, as more appropriate for the specific application. Increasing the thickness of the insulating layers may result in some cost increase, but provides advantages in term of greater length of power transmission, as it will be detailed further on. In the event the diameter of the three-phase cable is greater than those of the first and second insulated core of more than 2%, the diameters of the first and second insulated core is preferably increased by increasing the thickness of the polymeric sheath.

According to a second aspect, the present invention relates to a submarine cable system operation method, comprising:
  providing a submarine cable system comprising:
    a first and a second insulated core;
    a three-phase cable comprising three stranded insulated cores, the three-phase cable being stranded with the first core and the second core;
    an armour surrounding the first core, the second core and the three-phase cable;
  transmitting DC electrical power by said first and second cores;
  transmitting AC electrical power by said three-phase cable.

The transmission of DC electrical power can be simultaneous or alternative to the transmission of AC electrical power.

In accordance with a first embodiment, transmitting AC electrical power comprises supplying said AC electrical power from a shore substation to a wind farm generation system, and transmitting DC electrical power comprises supplying said DC electrical power from the wind farm generation system to the shore substation. According to a second embodiment, transmitting AC electrical power comprises supplying AC electrical power generated by a wind farm system to a corresponding shore substation.

According to a third embodiment, the method further comprises: discontinuing transmission of said AC electrical power, discontinuing transmission of said DC electrical power by said first core, and transmitting said DC electrical power through said second core as forward conductor and through the three-phase cable as return conductor.

The cable system of the present invention is particularly suitable in power generation plants, for example offshore wind farms, where the first insulated core and the second insulated core can be employed to transmit the DC electrical power obtained by turbine generators, and the three-phase cable is employed to supply alternate current to ancillary systems of the plant.

BRIEF DESCRIPTION OF THE DRAWINGS

Further characteristics and advantages will be more apparent from the following description of a preferred embodiment and of its alternatives given as a way of an example with reference to the enclosed drawings in which.

DETAILED DESCRIPTION

In the following description, same alphanumeric references are used for analogous exemplary elements when they are depicted in different drawings. An embodiment of a submarine cable system 100 will be described with reference to FIG. 1 and FIG. 2. The submarine cable system 100 can be used for carrying electric power below water surface. As will be further clarified later, the submarine cable system 100 can operate both as bipolar HVDC (High Voltage Direct Current) cable and HVAC (High Voltage Alternate Current) cable.

Figure 1:
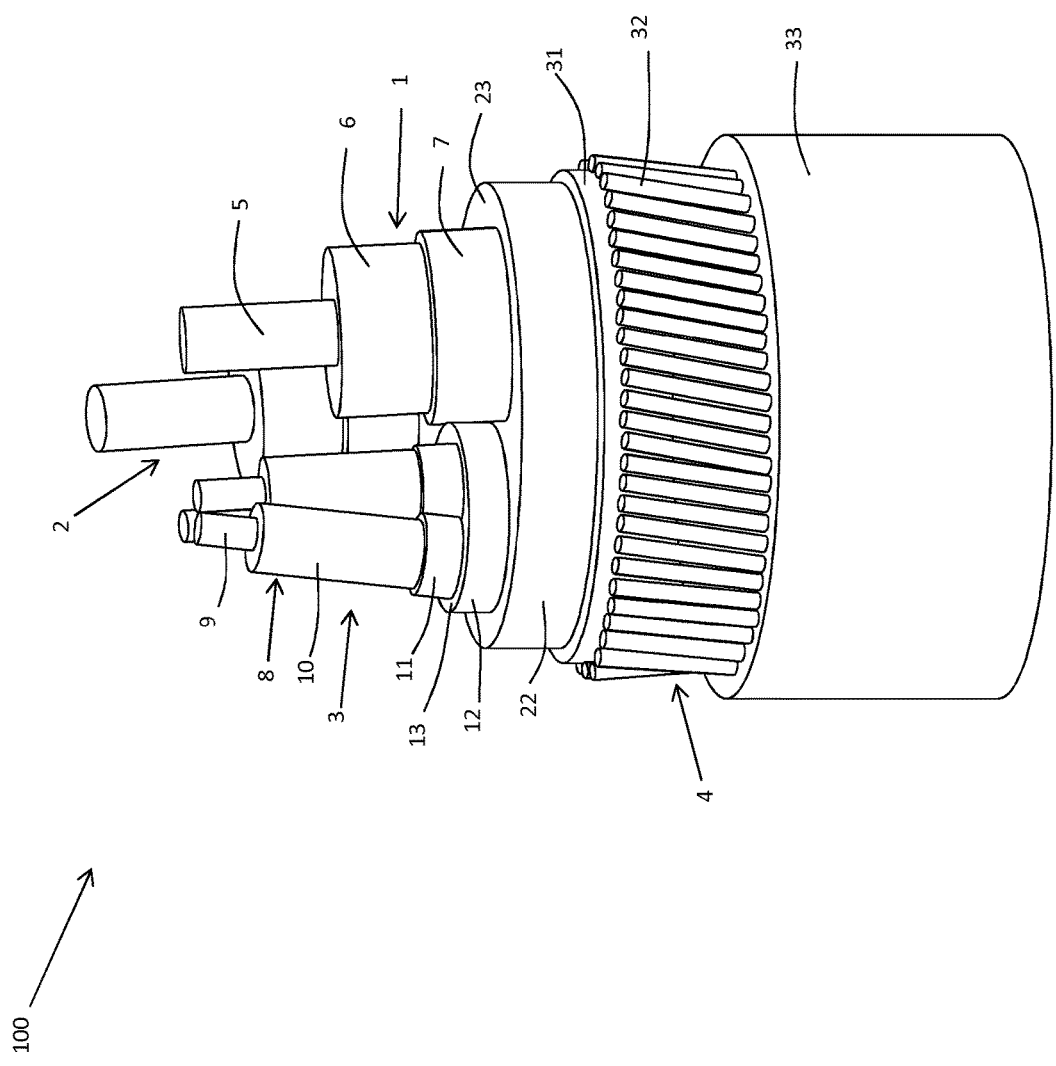
FIG. 1 shows a perspective view of an embodiment of a submarine cable.
Figure 2:
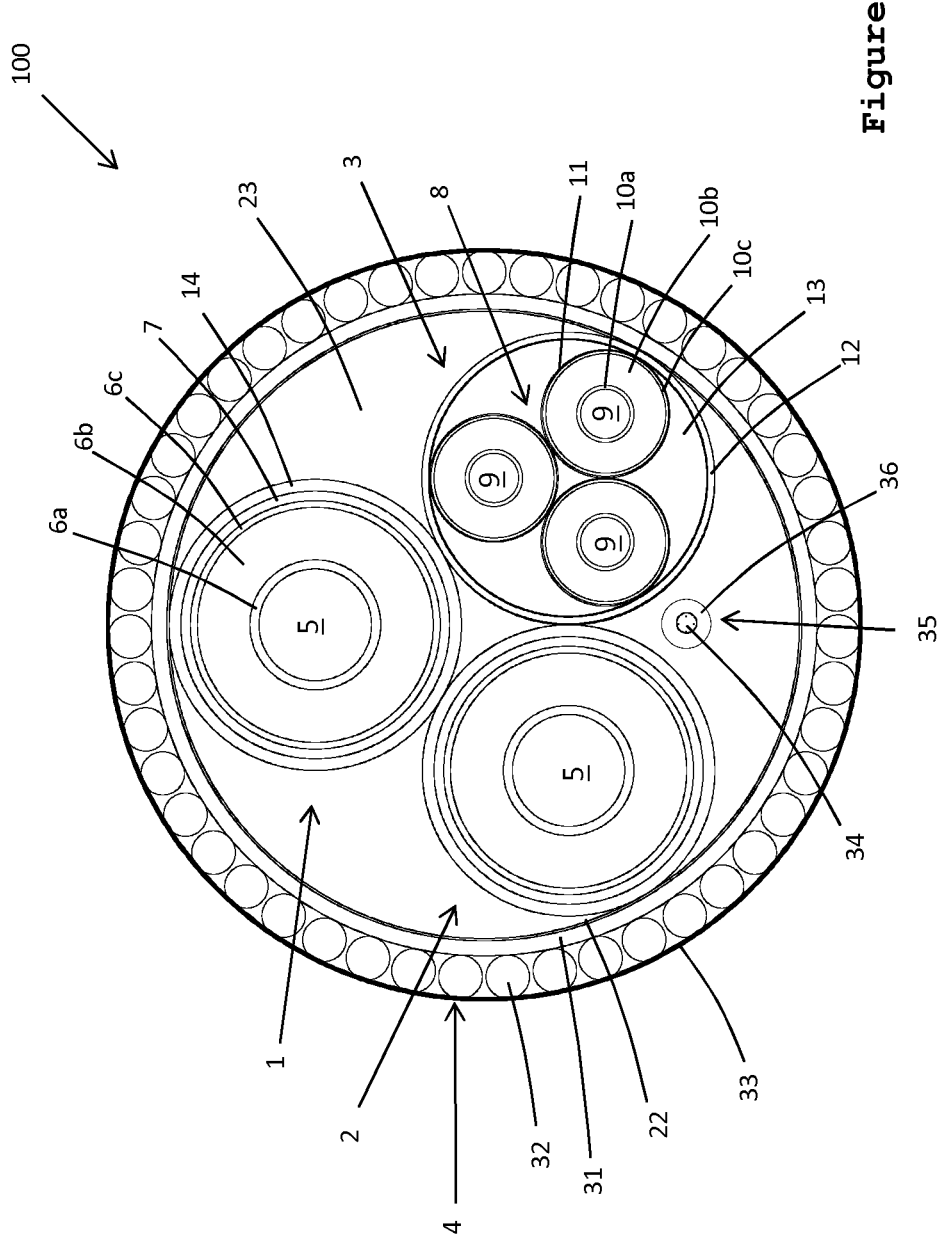
FIG. 2 shows cross section view of said submarine cable.

The submarine cable system 100 shown in the FIGS. 1 and 2 comprises: a first insulated core 1 for carrying direct current, a second insulated core 2 for carrying direct current and a three-phase cable 3 for carrying alternate current. An armour 4 (single layer) surrounding the first insulated core 1, the second insulated core 2 and the three-phase cable 3 is also provided. The first insulated core 1, the second insulated core 2 and the three-phase cable 3 are stranded with an S-Z lay.

The first core 1 and the second core 2 comprise each a first electric conductor 5 and a first electrically protective assembly 6 surrounding the first electric conductor 5 and comprising a first inner semiconducting layer 6a, a first insulating layer 6b and a first outer semiconducting layer 6c (see FIG. 2). Each first core 1 and second core 2 is further provided with a first metallic screen 7 surrounding the first electrically protective assembly 6.

The first electric conductor 5 can be made of an electrically conductive metal, such as copper or aluminium or both, in form, as an example, of a rod, stranded wires, profile wire or segmental conductor. Preferably, the first electric conductors 5 are made of aluminum.

Preferably, the first inner semiconducting layer 6a, first insulating layer 6b and first outer semiconducting layer 6c are made of extrudable polymeric materials, such as polyethylene, crosslinked polyethylene (XLPE) or ethylene propylene rubber (EPR), the material of the semiconducting layers 6a, 6c being added with a conductive filler, such as carbon black. The inner semiconducting layer 6a, the insulating layer 6b and the outer semiconducting layer 6c are manufactured by extrusion of the polymeric materials on the first electric conductor 5.

Alternatively, the first insulating layer 6b can be made of paper or paper-polypropylene tapes impregnated with suitable viscosity oil as disclosed, for example, in GB 2,196,781, U.S. Pat. No. 5,850,055 and WO2011/073709.

The first metallic screen 7 can be made of lead alloy or copper or aluminium in form of tape, wires or braids. A polymeric sheath 14 (see FIG. 2), made, for example, of polyethylene and, optionally, semiconductive, is suitably provided around the first metallic screen 7.

It is observed that the first insulated core 1 and the second insulated core 2 can operate, as an example, at electrical voltages comprised between 80 kV and 600 kV. As an example, when the first insulation layer 6b is made of extrudable polymeric material like XLPE, a rated voltage up to 350-400 kV can be reached and at a maximum allowable conductor operation temperature of 70-90° C. When the first insulation layer 6b is made of paper or paper-polypropylene tapes, a rated voltage up to 600 kV can be reached and at a maximum allowable conductor operation temperature of 90° C.

In accordance with the indicated electrical voltage values, the maximum steady-state DC power which can be transferred with the first and second cores 1 and 2 is, as an example, included into the range 500-1500 MW; a preferred value is 1000 MW. It is observed that the maximum steady-state DC power transfer also depends on environmental parameters such as temperature and soil thermal resistivity.

The three-phase cable 3 comprises three stranded insulated cores 8. In the present case the three insulated cores 8 are stranded with a unidirectional lay according to a first pitch and a first lay direction. Each stranded insulated core 8 comprises: a second electric conductor 9 and a second electrically protective assembly 10 surrounding the second electric conductor 9 and comprising a second inner semiconducting layer 10a, a second insulating layer 10b and a second outer semiconducting layer 10c (see FIG. 2). A second metallic screen 11 is provided to surround each second electrically protective assembly 10.

Preferably, the inner semiconducting layer 10a, insulating layer 10b and outer semiconducting layer 10c are made of extrudable polymeric materials, such as polyethylene, crosslinked polyethylene (XLPE), ethylene propylene rubber (EPR) or, particularly in the case of the insulating layer 10b, of a propylene based mixture as disclosed, for example, in WO 02/03398, WO 02/27731, WO 04/066317, WO 04/066318, WO 07/048422, and WO 08/058572. The material of the semiconducting layers 6a, 6c is added with a conductive filler, such as carbon black. The inner semiconducting layer 10a, the insulating layer 10b and the outer semiconducting layer 10c are manufactured by extrusion of the polymeric materials on the second electric conductor 9.

A first sheath 12 surrounds the three stranded insulated cores 8 as well as a first bedding or interstitial filler material 13. The first bedding 13 can be made of extrudable polymeric material, of fibrous material or of three preformed frames having a substantially triangular shape.

The three-phase cable 3 is configured to carry an alternate current at a voltage of from 20 to 170 kV and at a maximum allowable continuous conductor operation temperature of 90° C. when the insulating layer is made of a polymeric material such as XLPE, or of 100° C., but also of 130-140° C. when the insulating layer is made of EPR or of a thermoplastic material such as a propylene based mixture.

The stranded three-phase cable 3, first insulated core 1 and second insulated core 2 are embedded in a second bedding or interstitial filler 23. The second bedding 23 can be made of material similar to the one listed for the first bedding 13.

A second sheath 22, which can be analogous to the first sheath 12 surrounds the second bedding 23, the three-phase cable 3, first insulated core 1 and second insulated core.

A cushioning layer 31 (made, for example, of polypropylene yarns) surrounds the second sheath 22. Around the cushioning tape 31 the armour 4, comprising at least one layer of wires 32, is provided. The wires 32 are wound around the cushioning tape 31 according to a third pitch value and a third lay direction.

The wires 32 can be all made of metal (e.g. steel or composite comprising steel) or some of them can be made of a polymeric material such as aramid. Wires 32 made of both metal and polymeric material can be also envisaged. An outer jacket 33 surrounds advantageously the armour 4. The outer jacket 33 can be made of polypropylene yarns or high density polyethylene.

The submarine cable system 100 further comprises an optical cable 35 (shown in FIG. 2) positioned in the second bedding 23. The optical cable 35 comprises a plurality of optical fibres 34 advantageously embedded in a waterblocking material and surrounded by a polymeric sheath 36. The optical cable 35 is suitable for data transmissions and/or for monitoring the submarine cable system 100 status.

With reference to examples of applications of the submarine cable system of the invention, it is observed that it can be employed in any of the traditional applications of submarine cables, such as: offshore wind farms, power supply to islands, connection of autonomous grids, supply of marine platforms, short-haul crossings (e.g. transport of power across rivers, channels, straits, fjords, bays or lakes).

Particularly, the submarine cable system of the invention can be employed in any situation in which DC electrical power and AC electrical power need to be transmitted along the same path connecting electrical systems. It is observed that the transmission of DC electrical power and AC electrical power along the submarine cable system 100 can be performed non-simultaneously, i.e. in alternative manner. However, a simultaneous transmission of DC electrical power and AC electrical power along the submarine cable system 100 is also possible.

With reference to possible length values of the submarine cable system of the invention, it is observed that the maximum length is advantageously selected taking into account the power transmission performances of the three-phase cable carrying AC current. Indeed, the Applicant observed that the electrical transmissible power decreases with cable route length. As an example, the feasible length of the submarine cable system is lower than 400 Km, preferably lower that 300 Km.

Figure 3:
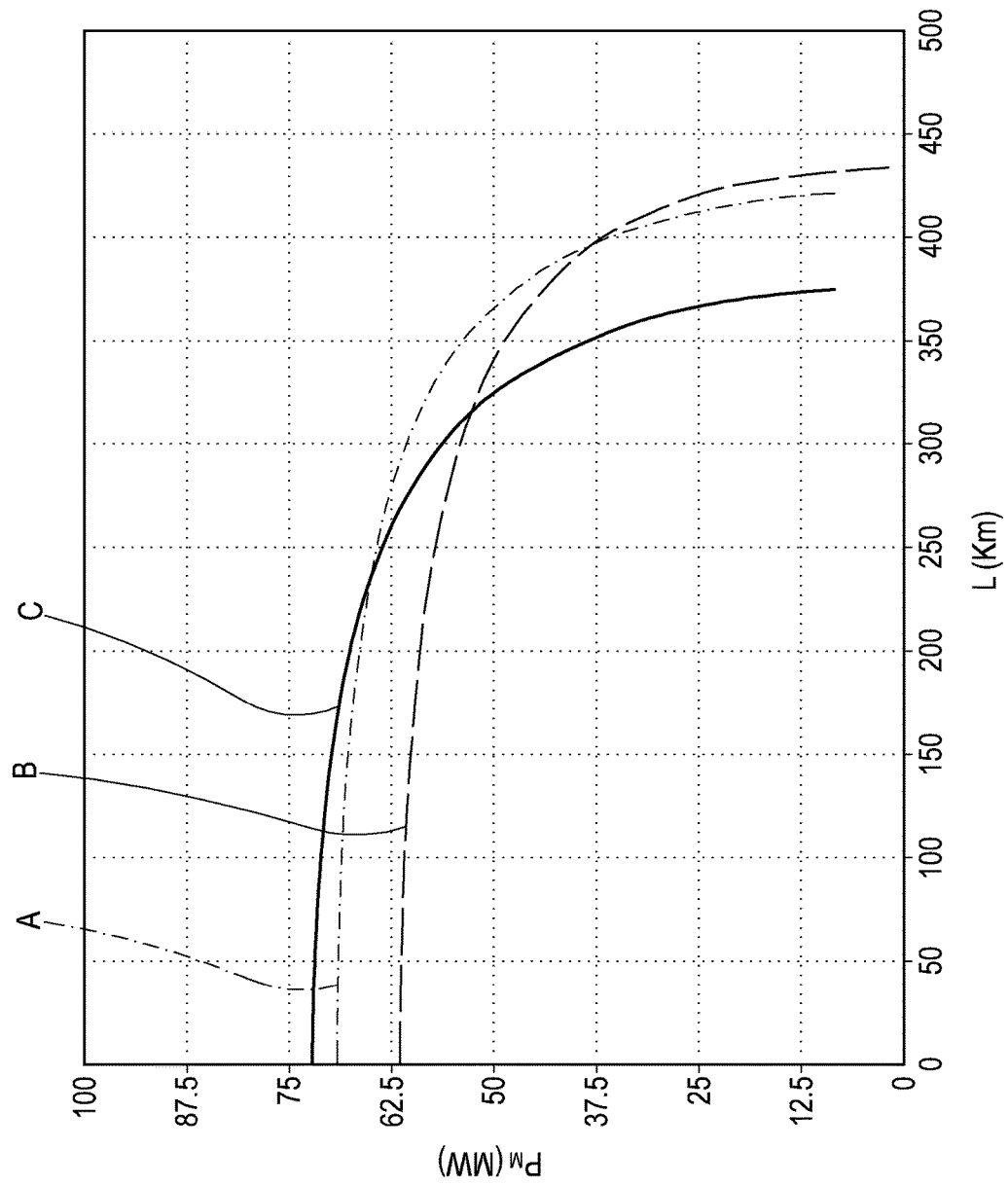
FIG. 3 refers to software simulations on the performances of said submarine cable for AC power transmission.

As known to the skilled person, in the submarine cable design the minimum required thickness of the insulating layer is calculated as a function of keeping the cable electric field within acceptable value for a given AC power to be carried. The Applicant has observed that in order to maximize the transmissible AC power beyond certain distances it could be preferable to increase the insulation thickness instead of the conductor cross section of the internal AC cable. Particularly, FIG. 3 shows a first curve A, a second curve B and a third curve C obtained by software simulations and representing, as an example, the maximum transmissible active power at sending end $P_M$ (expressed in MW) for the AC carrying three-phase cable versus the cable length L (expressed in Km), at a voltage of 66 kV and for three different insulation thickness values. The first curve A refers to an AC carrying three-phase cable having insulation layers with a respective thickness of 12.3 mm and the electric conductors (made of copper) having respective cross section 3×300 mm$^2$. The second curve B refers to an AC carrying three-phase cable having insulation layers with a respective thickness of 13.4 mm and electric conductors (made of copper) having respective cross section 3×240 mm$^2$. The third curve C refers to an AC carrying three-phase cable having insulation layers with a respective thickness of 10.8 mm and electric conductors (made of copper) having respective cross section 3×400 mm$^2$.

FIG. 3 shows that, taking the cable of curve A as reference, the best long distance performance (a length exceeding 300 km) is obtained by the cable of curve B—having a greater insulation thickness and a smaller conductor cross section with respect to the cable of curve A—rather than by the cable of curve C—having a smaller insulation thickness and a greater conductor cross section with respect to the cable of curve A—. In case the diameter of the three-phase cable is to be made suitably similar to those of the first and second insulated conductors, it can be more advantageous increasing the insulation thickness than the conductor diameter as needed by the specific application.

In accordance with an example, the submarine cable system of the invention can be designed to be mostly employed to carry DC electrical power while the AC electrical power is transmitted only in particular situations. With reference to the application in an offshore wind farm, the first insulated core and the second insulated core can be employed to transmit the DC electrical power obtained by a plurality of wind turbine generators and after an AC/DC conversion, towards a shore substation. In this particular situation, the three-phase cable can be employed in a starting step i.e. to supply alternate current from the shore substation to start-up the offshore AC/DC converter and all the necessary auxiliary systems within the offshore windfarm. The transmission of AC power can be discontinued at the end of the starting step to allow transmission of the DC power from the wind farm to the shore station by the first insulated core and the second insulated core.

Moreover, the three-phase cable can be employed to transmit AC electrical power in the same direction employed for the DC power, e.g. from the wind farm to the shore station, when the first insulated core and the second insulated core are off. This operation mode could be convenient when the power to be transmitted from the windfarm to the shore is relatively small, which could make it convenient/necessary to switch from DC transmission to AC because of better power transmission efficiency or converter technical limits.

In accordance with another example, at least one of the stranded insulated cores of the three-phase cable can be employed to carry DC power when the first insulated core or the second insulated core is out of service.

The submarine cable system of the invention is particularly advantageous since it allows reduction of manufacturing costs and materials, installation costs, complexity and occupied installation room in comparison with known solutions. Moreover, the submarine cable of the invention allows a high flexibility for transmission of AC and DC electrical power.

The invention claimed is:

1. A submarine electrical cable system having a substantially circular cross-section and comprising:
   a first insulated core and a second insulated core each suitable for DC transmission;
   a three-phase cable comprising three stranded insulated cores suitable for at least AC transmission, the three-phase cable being stranded with the first insulated core and the second insulated core; and
   an armour surrounding the first insulated core, the second insulated core, and the three-phase cable,
   wherein the submarine electrical cable system is free of insulated cores suitable for DC transmission other than said first and second insulated cores and free of three-phase cables suitable for at least AC transmission other than said three-phase cable comprising the three stranded insulated cores.

2. The submarine electrical cable system according to claim 1, wherein the first and the second insulated cores are suitable for DC transmission at a voltage of 80 kV at least.

3. The submarine electrical cable system according to claim 2, wherein the three stranded insulated cores of the three-phase cable are suitable for AC transmission at a voltage of 30 kV at least.

4. The submarine electrical cable system according to claim 1, wherein the three-phase cable comprises a first sheath surrounding the three stranded insulated cores.

5. The submarine electrical cable system according to claim 1, wherein the three stranded insulated cores of the three-phase cable are stranded with a unidirectional lay according to a first pitch and a first lay direction.

6. The submarine electrical cable system according to claim 5, wherein the first insulated core, the second insulated core, and the three-phase cable are stranded with a unidirectional lay according to a second pitch and a second lay direction, wherein the second lay direction is opposite to the first lay direction.

7. The submarine electrical cable system according to claim 5, wherein the armour comprises a plurality of armour wires arranged in a single armour layer,
the armour wires are wound a unidirectional lay according to a third pitch and a third lay direction, and
the third lay direction is the same of the first lay direction.

8. The submarine electrical cable system according to claim 5, wherein
the armour comprises a plurality of armour wires arranged in a single armour layer,
the armour wires are wound a unidirectional lay according to a third pitch and a third lay direction, and
the third pitch is from 0.4 to 2.5 times the first pitch.

9. The submarine electrical cable system according to claim 1, wherein the three stranded insulated cores of the three-phase cable are stranded with an S-Z lay.

10. The submarine electrical cable system according to claim 1, wherein the first insulated core, the second insulated core, and the three-phase cable are stranded with a unidirectional lay according to a second pitch and a second lay direction.

11. The submarine electrical cable system according to claim 1, wherein the first insulated core, the second insulated core, and the three-phase cable are stranded with an S-Z lay.

12. The submarine electrical cable system according to claim 1, wherein the three stranded insulated cores of the three-phase cable are stranded with a unidirectional lay according to a first pitch and a first lay direction, and the first insulated core, the second insulated core, and the three-phase cable are stranded with an S-Z lay.

13. The submarine electrical cable system according to claim 1, wherein the armour comprises a plurality of armour wires arranged in a single armour layer.

14. The submarine electrical cable system according to claim 13, wherein the armour wires are wound a unidirectional lay according to a third pitch and a third lay direction.

15. The submarine electrical cable system according to claim 1, wherein the first insulated core and the second insulated core are configured to carry a direct current at a voltage of 600 kV at most and the three-phase cable is configured to carry an alternate current at a voltage of 170 kV at most.

16. The submarine electrical cable system according to claim 1, wherein the first and second insulated cores and three-phase cable have diameters differing from one another of 2% at most.

17. A submarine cable system operation method, comprising:
providing a submarine cable system comprising:
a first insulted core and a second insulated core suitable for DC transmission;
a three-phase cable comprising three stranded insulated cores suitable for at least AC transmission, the three-phase cable being stranded with the first insulated core and the second insulated core; and
an armour surrounding the first insulated core, the second insulated core, and the three-phase cable;
transmitting DC electrical power by said first and second insulated cores; and
transmitting AC electrical power by said three-phase cable,
wherein the submarine cable system is free of insulated cores suitable for DC transmission other than said first and second insulated cores and free of three-phase cables suitable for at least AC transmission other than said three-phase cable comprising the three stranded insulated cores.

18. The method according to claim 17, wherein said transmitting DC electrical power is simultaneous or alternative to said transmitting AC electrical power.

19. The method according to claim 17, wherein said transmitting AC electrical power comprises supplying said AC electrical power from a shore substation to a wind farm generation system, and said transmitting DC electrical power comprises supplying said DC electrical power from the wind farm generation system to the shore substation.

20. The method according to claim 17, wherein said transmitting AC electrical power comprises supplying AC electrical power generated by a wind farm system to a corresponding shore substation.

21. The method according to claim 17, comprising discontinuing transmission of said AC electrical power, discontinuing transmission of said DC electrical power by said first insulated core, and transmitting said DC electrical power through said second insulated core as forward conductor and through the three-phase cable as return conductor.

* * * * *